United States Patent Office.

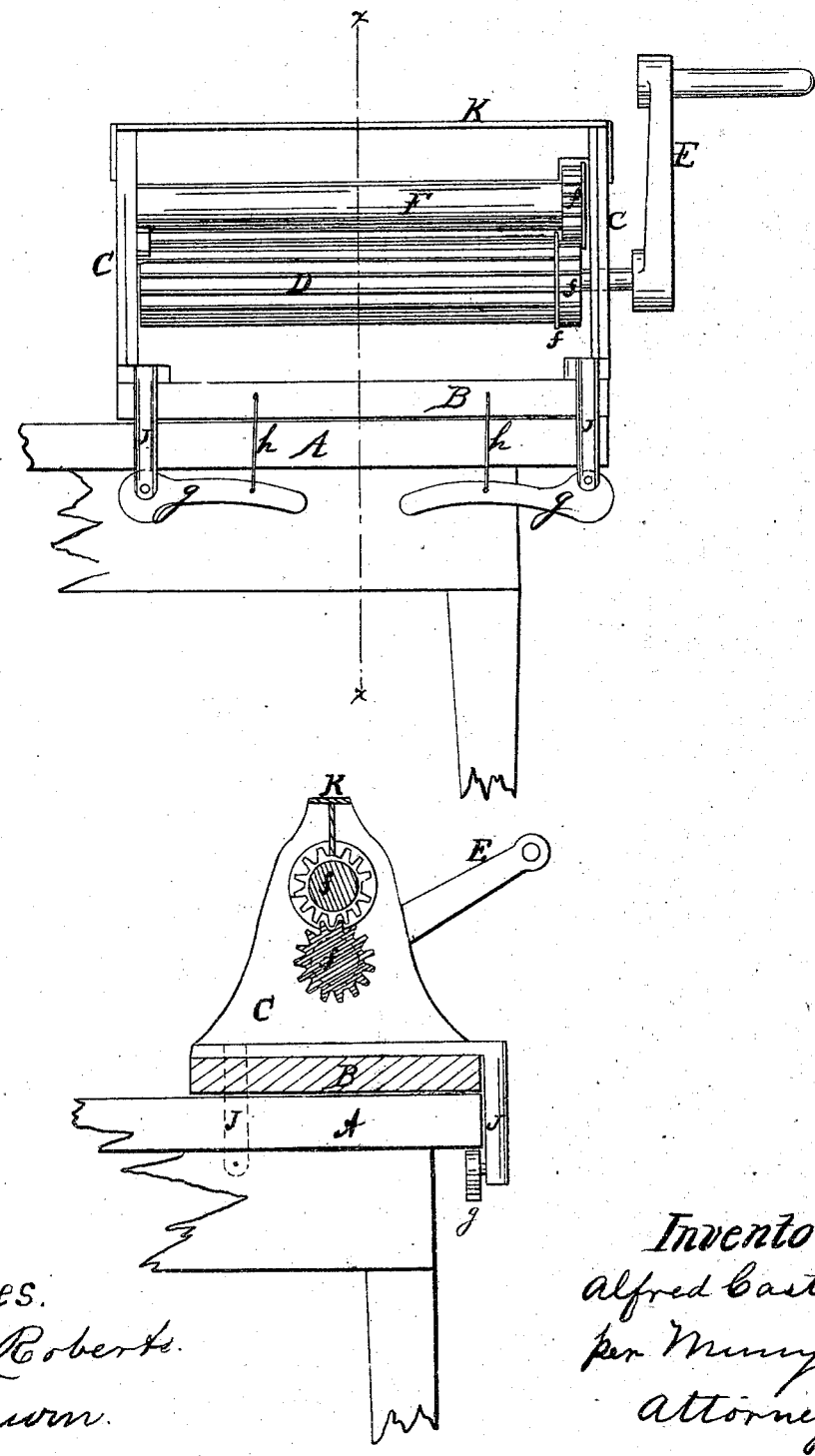

ALFRED CASTELLAW, OF CHESTER, ILLINOIS.

Letters Patent No. 74,304, dated February 11, 1868.

IMPROVED STEAK-CRUSHER.

The Schedule referred to in these Letters Patent and making part of the same.

TO ALL WHOM IT MAY CONCERN:

Be it known that I, ALFRED CASTELLAW, of Chester, in the county of Randolph, and State of Illinois, have invented a new and improved Steak-Crusher; and I do hereby declare that the following is a full, clear, and exact description thereof, which will enable those skilled in the art to make and use the same, reference being had to the accompanying drawings forming part of this specification.

This invention relates to a new and improved method of constructing machines for crushing beef and other kinds of steaks or meats; and the invention consists in constructing a machine with a fluted cylinder, which is geared to another smooth or plain cylinder or roller, in combination with a suitable frame, the cylinders being revolved therein, and the steak to be crushed being passed between them, as will be hereinafter described.

Figure 1 represents a side elevation of the crusher attached to a table.

Figure 2 is a vertical section of fig. 1, through the line $x\ x$.

Similar letters of reference indicate corresponding parts.

A represents the table. B is the bed-plate of the machine. C represent the end-pieces or stands. D is the fluted cylinder, which has journals at each end, one of which journals passes through the end-piece C, and has a crank, E, attached, by which the cylinders are revolved. F is the smooth cylinder or roller, which also has journals or pivots in each of its ends, which rest in holes or boxes in the ends C. On one end of each of the cylinders there are gear-wheels, which engage with each other, as seen in the drawing. These gears are marked $f\ f$, and are plainly seen in fig. 2. The machine is secured to the table by three, more or less, eccentric-levers or lever-cams, as seen at $g$. These eccentrics or cams are attached to hanging hooks, J, and the levers of the eccentric are held up, when not in use, by wire hooks attached to the bed-plate of the machine, as seen at $h\ h$. K is a cap-piece, across the top of the machine, for the proper support of the end-pieces C, and for keeping the roller F in place.

When the crank is turned, the cylinders are revolved together, but the upper cylinder, being of less diameter, holds the meat while the fluted cylinder crushes the fibre, and thereby renders it tender and suitable for the table. There is a flange on the fluted cylinder, seen at $f$, for the purpose of keeping the meat from the gear-wheels while being crushed.

Having thus described my invention, I claim as new, and desire to secure by Letters Patent—

The steak-crusher, constructed as described, consisting of the smooth upper roller F and lower corrugated roller D, operated by the gearing $f$ in the frame, the end-pieces, C, of which frame are secured together by the plate $k$, whose centre projects downward to form a scraper for the upper roller F, as herein shown and described.

ALFRED CASTELLAW.

Witnesses:
JAMES M. RALLS,
H. C. COLE.